United States Patent
Sundqvist et al.

(10) Patent No.: US 7,811,414 B2
(45) Date of Patent: Oct. 12, 2010

(54) METHOD AND SYSTEM IN A PAPER MACHINE AND SOFTWARE PRODUCT

(75) Inventors: Hans Sundqvist, Turku (FI); Petri Norri, Turku (FI)

(73) Assignee: Metso Paper, Inc., Helsinki (FI)

( * ) Notice: Subject to any disclaimer, the term of this patent is extended or adjusted under 35 U.S.C. 154(b) by 612 days.

(21) Appl. No.: 11/667,519

(22) PCT Filed: Nov. 11, 2005

(86) PCT No.: PCT/FI2005/000484
§ 371 (c)(1),
(2), (4) Date: May 10, 2007

(87) PCT Pub. No.: WO2006/051157
PCT Pub. Date: May 18, 2006

(65) Prior Publication Data
US 2007/0267160 A1    Nov. 22, 2007

(30) Foreign Application Priority Data
Nov. 12, 2004    (FI) .................................. 20041458

(51) Int. Cl.
*D21F 13/00*    (2006.01)
(52) U.S. Cl. ..................... 162/198; 162/263; 700/299
(58) Field of Classification Search .............. 162/198, 162/263; 700/299
See application file for complete search history.

(56) References Cited

U.S. PATENT DOCUMENTS

| | | |
|---|---|---|
| 4,413,427 A | 11/1983 | Villalobos et al. |
| 6,732,453 B2 | 5/2004 | Norri |
| 2003/0144746 A1 | 7/2003 | Hsiung et al. |
| 2005/0145357 A1 | 7/2005 | Muench et al. |

FOREIGN PATENT DOCUMENTS

| | | |
|---|---|---|
| DE | 32 24 744 A1 | 2/1983 |
| DE | 36 30 561 A1 | 3/1987 |
| DE | 43 04 244 A1 | 8/1993 |
| FI | 71372 | 9/1986 |
| FI | 865199 | 6/1988 |
| FI | 107395 | 7/2007 |

*Primary Examiner*—Mark Halpern
(74) *Attorney, Agent, or Firm*—Cohen Pontani Lieberman & Pavane LLP

(57) ABSTRACT

The invention comprises a method and a system in a paper machine, and also a software product, allowing one or more tools to be generated for indicating the state of the paper production process in terms of energy consumption to the operating staff of the paper machine. This allows continual monitoring of the state of the paper production process and/or its energy efficiency combined with efforts to develop the manners of running the paper machine and its dryer section in a more favourable direction. In one embodiment of the invention, the dry solids content DSC of the press section can be calculated by means of the evaporation amount of the dryer section, the production of finished paper and the final paper moisture as follows: $DSC = m_{pap,d}/(m_{pap,d} + m_{H2O})$, in which $m_{pap,d}$ is the dry mass flow of the paper web to the dryer section and $m_{H2O}$ is the water mass flow to the dryer section. $m_{H2O}$ is obtained by summing up the mass flow of the water discharged from the dryer section and the evaporated water mass flow.

26 Claims, 2 Drawing Sheets

METHOD AND SYSTEM IN A PAPER MACHINE AND SOFTWARE PRODUCT

PRIORITY CLAIM

This is a national stage of application No. PCT/FI2005/000484, filed on Nov. 11, 2005. Priority is claimed on Application No. 20041458, Filed in Finland on Nov 12, 2004.

FIELD OF TECHNOLOGY OF THE INVENTION

This invention relates to monitoring the operation of paper machines and to control of their operation. The invention relates especially to a new method and system for monitoring factors acting on the energy consumption in the dryer section of a paper machine and to a new method and system for measuring the dry solids content in the paper web after the press section.

STATE OF THE ART

In a typical paper machine, the paper raw material, i.e. the pulp, is brought to the so-called wet end of the paper machine, where dewatering of the pulp starts. The so-called head box is located at the wet end, the pulp being brought onto the wire through the head box, forming a paper web, from which water is removed by different methods in the course of the production process. The web is primarily dewatered in the wire section by water absorption with the aid of vacuum pumps. After the wire section, the paper web is transferred to the press section, where dewatering takes place by pressing e.g. with the aid of felts absorbing water. After the press section, the web is transferred to the dryer section, where final drying is performed. The drying in the dryer section is usually performed by means of heat generated with steam. The completely dried paper web can then be transferred to surface treatment or any other finishing treatment.

Typically in modern paper machines, the dryer section is principally surrounded by a closed hood; the moisture level of the exhaust air from the hood should be maintained on an optimal level in terms of the energy consumption of the process, typically at a ratio of 0.160 kg $H_2O$/kg of dry air. Manufacturers typically indicate a guaranteed moisture value of the exhaust air, which the hood should resist without any risk of condensation.

The amount of supply air conducted to the hood of the dryer section can be adjusted. The temperature of the supply air is generally kept constant by means of heat exchangers in a heat recovery tower and a steam battery using fresh steam. Both the exhaust air ducts and the supply air ducts typically comprise blowers equipped with air quantity control. The flow of exhaust air from the hood is typically controlled as a function of the moisture of the exhaust air. The exhaust air from the suction rolls in the dyer section is usually also led to the heat recovery. It is usually desirable to recover the energy contained in the humid and warm exhaust air of the suction rolls. Usually the pressure differences of the suction rolls and the runnability components are measured on a one-time basis using a manual gauge.

So far, there has not existed any reliable continuous measurement of the dry solids content after the press section of the paper web. Nevertheless, monitoring the dry solids content precisely after the press is very indicative of the function of the wet section of the paper machine and of the overall energy efficiency of the machine. In addition, monitoring of the dry matter and its modifications in the web after the press section readily provides information about the state and dewatering capacity of the press felts. The dry solids content of the web after the press is largely affected by the age of the press felts. After replacement of the felts, the operation of the press felts is usually rebalanced and the press function enhanced only at the end of three to five days. After this, fines removed from the web gradually obstruct the felts, thus deteriorating the dewatering of the press.

OBJECTS OF THE INVENTION

The present invention has the object of providing a system and a method for reducing or even totally eliminating prior art problems and drawbacks.

One purpose of the invention is a method and a system for continuous calculation of the dry solids content of the paper web after the press section on the basis of measurement data.

A second objective of the invention is a method and a system for monitoring the ventilation, heat recovery and other energy consumption factors in the dryer section.

A third objective of the invention is developing tools adapted for monitoring the heat energy use of a paper machine.

One purpose of the invention is also to provide a system and a method for more accurate and simple control of certain parts of a paper machine.

One purpose of the invention is also to enhance the runnability and energy consumption of a paper machine and to improve the produced paper quality.

In order to achieve the purposes mentioned above, among other things, the invention is characterised by the features defined in the characterising part of the accompanying independent claims.

MORE DETAILED DESCRIPTION OF THE INVENTION

In this application, energy use implies explicitly heat energy use. When use of electric energy is implied, this is explicitly indicated. A runnability component in this text denotes e.g. a blow box or the like.

One embodiment of the present invention provides for one or more tools for indicating the paper production process state in terms of energy consumption to the operating staff of a paper machine. This allows for continuous monitoring of the state and/or energy efficiency of the paper production process and for efforts to develop the manners of driving the paper machine and its dryer section in a more favourable direction.

In a preferred embodiment of the invention, the dry solids content DSC of the press section can be calculated by means of the evaporation quantity of the dryer section, the production of the finished paper and the final moisture of the paper, as follows:

$$DSC = m_{pap,d} / (m_{pap,d} + m_{H2O})$$

in which $m_{pap,d}$ is the dry mass flow of the paper web to the dryer section and $m_{H2O}$ is the water mass flow to the dryer section, whereby $m_{H2O}$ is obtained by adding up the mass flow of the water removed from the dryer section and the evaporated water mass flow. It should be noted that when using the calculation model above, the dry solids content of the press is calculated on the basis of the evaporation data of the dryer section. Consequently, the calculation may be inaccurate due to the inaccuracy in the moisture measurement and quantity measurement of the exhaust air of the hood. This is why using the system of the invention usually comprises monitoring of changes in the trend of the dry solids content values rather than of absolute numerical values. However, this method reveals changes in e.g. the ash contents of the paper.

In a typical preferred method of the invention the following operations are performed in the paper machine:

measuring the dry mass flow $m_{pap,d}$ of the paper web and the water mass flow contained in the web removed from the dryer section. These measurements can be made with typical prior art gauges, for instance. The paper grammage, for instance, can be measured by means of a gauge based on beta radiation absorption. For measurement of paper moisture, one can use measurements based on e.g. infrared light absorption, microwave attenuation or radiofrequency techniques. These measurements allow calculation of the dry paper grammage and the water grammage. Knowing the paper machine speed and the web width subsequently allow calculation of the mass flows. These measurements are usually made over the entire width of the paper by moving a measuring sensor fixed to a measuring beam continuously in the cross-machine direction.

measuring the temperature, moisture and amount of the exhaust air from the hood and using these data for calculating the water mass flow $m_{ev}$ evaporated from the web in the dryer section calculating the water mass flow $m_{H2O}$ contained in the web passing from the press section to the dryer section by summing up the water mass flow contained in the paper leaving the dryer section and the water mass flow $m_{ev}$ evaporated from the web in the dryer section calculating the dry solids content DSC of the web passing from the press section to the dryer section by the formula: $DSC = m_{pap,d}/(m_{pap,d} + m_{H2O})$.

One system of the invention in a paper machine comprises means for carrying out the steps of the method mentioned above. The measurements mentioned above are typically performed with prior art gauges, such as temperature, moisture and mass flow sensors. The necessary calculation is typically carried out in a computer memory under suitable computer software.

The invention enables continuous monitoring of the dry solids content after the press section without direct measurement. The dry solids content after the press section can be used as an indicative measurement variable, whose variation indicates the overall operation and/or runnability of the paper machine and the function of the press. The dry solids content can also be used as an error indicator, e.g. by tracing runnability problems at the forward end of the dryer section and/or condensation in the hood. The dry solids content after the press section can also be used for expressing any malfunctions and/or required service, such as the state or the press felts or the function of the nip. This allows e.g. the wires and felts to be used over a maximum period without prematurely replacing them just in order "to be on the safe side", the felts or the wires being replaced only when the dry solids content indicates that a replacement is necessary. In fact, in one embodiment of the invention, the dry solids content after the press section is used for timing a felt replacement shutdown or a wire replacement shutdown. The dry solids content after the press section can be used also for localising other defects in the dryer section or the wet end of the paper machine.

The dry solids content after the press section may serve for control of the adjustment of the wet end of the paper machine. If the paper web is stated to be excessively wet when reaching the dryer section, then the amount of water contained in the paper web can be modified e.g. by changing the settings at the wet end of the paper machine. This allows for control at the wet end of e.g. underpressure in the dewatering devices, chemical feed rates and/or linear pressures in the press, and also control of the press steam box. In other words, the runnability of the dryer section can be adjusted using the dry solids content of the paper web after the press section as an evaluation variable. If the dryer section of the paper machine is provided with a ventilation control system, such as an "XT control system" or a corresponding system, the dry solids content of the press section can be calculated on the basis of the data thus obtained. Otherwise, a necessary amount of sensors needs to be added to the process for measuring the dry solids content. The XT control system is described e.g. in the Finnish patent specification FI 71372.

In addition to or instead of mere measurements, the system of the invention enables the generation of clear indicators of the current state, runnability, energy use efficiency of the paper machine and/or of the current state of the ventilation and heat recovery of the dryer section. In a preferred embodiment of the invention, so-called virtual analogue gauges can be constructed for this purpose for transmitting these particular data to the operating staff via the software product of the invention. This enables operators to search new long-term means for enhanced energy use of the paper production process.

The present invention is particularly suitable for paper machines whose dryer section implements an XT control system or the like, i.e. moisture, temperature and quantity measurements are arranged for the exhaust air from the dryer section hood. Temperature measurement of the exhaust air from the hood can also be provided after the heat recovery units. Temperature measurements and exhaust air quantity measurements are also typically arranged for the exhaust air from the suction rolls.

In one embodiment of the invention, one or more of the following measurements are included in the process in addition to those mentioned above:

exhaust air temperatures after the supply air heat exchangers, temperatures of the heat recovery condensate, exhaust air temperature after the heat recovery, measurement of the temperature difference of the cooling water of the final steam condenser, flow measurement of the cooling water of the final steam condenser, measurement of the hood ceiling and the mixing temperature of the air of the machine room measurement of the amount of air in the suction rolls, measurement of the underpressure in the runnability components, pressure differences of the blowers, measurement of the input power of the blowers, pressure differences over the heat recovery towers and/or pressure drop in the process water heat exchangers of the heat recovery.

In one embodiment of the invention, a system for monitoring the operation and energy efficiency of a paper machine can be constructed by including i.a. the measurements mentioned above in the process control and data collection systems.

The specific energy consumption (SEC) of a paper machine is one of the variables that can be calculated with the system and method of the invention. In this application, specific energy consumption denotes the amount of heat energy consumed per one ton of produced paper or evaporated water, i.e. MWh/(tn of paper), this unit being referred to below with the abbreviation MWh/tp, or MWh/(kg $H_2O$).

The specific energy consumption can be calculated by the following formula:

$$SEC_t = Q_{tot}/m_{pap}$$

in which $Q_{tot}$ is the momentary heat flow consumed by the paper machine and $m_{pap}$ is the mass flow of finished paper by unit of time.

In accordance with the present invention, the state, runnability and/or specific energy consumption of a paper production process can thus be advantageously measured in real time in a paper machine. Previously heat energy consumption, for instance, has usually been indicated as a long-term mean value. The specific energy consumption is often a direct function of the production speed of the paper machine. The heat energy consumption usually decreases as the production increases. Paper machines usually have specific basic energy consumption, which is independent of the production volume. For instance, the heat required for ventilation in the machine room depends on the outdoor temperature, and hence the amount of heat energy required for this is not dependent of the production rate of the paper machine. Lower production actually often results in lower heat recovery yield of the dryer section, requiring the use of more fresh steam for heating the air of the machine room, signifying that the specific energy consumption may increase even though the production output of the paper machine is lower. There are also other factors that may cause non-linearity to specific energy consumption, such as the way of running the press steam box or any shutdowns of the drying cylinders in the dryer section in certain production situations.

For the specific energy consumption to be better evaluated in each production situation, one embodiment of the invention involves determination of good realised energy use values for each production level. These values allow calculation, e.g. by the method of the smallest sum of squares, a straight line indicating the limit values under which the specific energy consumption is on an acceptable level. In addition, mean values of specific energy consumption allow calculation of a second straight line, above which the energy consumption values are too high. In such a situation, the operating staff should look for the cause of the situation and eliminate the causes as far as possible. The specific energy consumption is on an acceptable level, which yet requires monitoring in the range between these two straight lines. Such a method, in which the values of monitored variables describing the operation of a paper machine are divided into acceptable and unacceptable values, and possible further into intermediate values requiring supervision, can be applied in accordance with the invention to the monitoring and evaluation of other variables besides those of specific energy consumption mentioned above. The data monitored by the method are easy to display in a simple and comprehensible form with adequate accuracy.

Besides the overall specific energy consumption of a paper machine, one preferred embodiment of the invention comprises monitoring also of the specific energy consumption of the dryer section ($SEC_{dry}$), i.e. of the amount of heat energy required for drying one ton of paper. The specific energy consumption of the dryer section can be used for indicating the operation of the press section of the paper machine together with the dry solids content of the press, because an excessively wet web reaching the dryer section will lead to increased specific energy consumption of this section. The specific energy consumption may also increase as a result of malfunctions in the operation of the dryer section, such as inadequate discharge of condenser water from the dryer section cylinders. The specific energy consumption of the dryer section can be calculated as follows:

$$SEC_{dry} = Q_{dry}/m_{pap}$$

in which $Q_{dry}$ is the heat flow of the steam used in the dryer section and $m_{pap}$ is the mass flow of finished paper.

One embodiment of the invention involves measurement also of evaporation specific energy consumption ($SEC_{ev}$). Evaporation specific energy consumption implies the amount of heat energy required for evaporating one kilogram of water in the dryer section. In cylinder drying, the amount of energy required for evaporating one kilogram of water usually varies in the range of 0.77-1.11 kWh/kg $H_2O$. Evaporation specific energy consumption can be calculated as follows:

$$SEC_{ev} = Q_{dry}/m_{ev}$$

in which $Q_{dry}$ is the heat flow of the steam used in the dryer section and $m_{ev}$ is the mass flow of the water evaporated from the web.

However, the use of the formula above for calculating the evaporation amount leads to certain inaccuracies due to the inexact measurements of the moisture and flow rates of the exhaust air from the hood and to the fact that the calculation does not consider that the energy input of the paper web to the dryer section is slightly higher than its energy output from the dryer section. However, monitoring the evaporation specific energy consumption provides information about the drying proper, because an increase of temperature needed for evaporation usually is a sign of problems in the dryer section, such as deteriorated condensate removal from the cylinders. The production volume also affects the evaporation specific energy consumption. Higher production volume results in a smaller amount of heat required for evaporating one kilogram of water. The same is true if the dry solids content after the press section decreases.

One embodiment of the invention also uses the heat recovery heat flow as a monitoring parameter together with one or more of the parameters described above. The exhaust air heat flow can be calculated on a change of the enthalpy of the exhaust air from the hood. The enthalpy can be calculated as follows:

$$h = c_{pi}*t + (c_{ph}*t + I_{h0})*X$$

$$Q = m_{exh,d}*h$$

in which $c_{pi}$ is the specific heat capacity of air, t is the temperature, $c_{ph}$ is the specific heat capacity of water steam, $I_{h0}$ is the evaporation heat of water, x is the absolute humidity of exhaust air, $m_{exh,d}$ is the mass flow of dry exhaust air. Then the heat recovery heat flow can be calculated as follows $$Q_{rec} = Q_1 - Q_2$$

in which $Q_{rec}$ is the heat recovery heat flow, $Q_1$ is the exhaust air heat flow before the heat recovery and $Q_2$ is the exhaust air heat flow after the heat recovery.

Even though the calculation of the heat recovery heat flow may involve certain inaccuracies, it still gives an excellent notion of the amount of heat that is recovered from the exhaust air. Quantity and moisture measurements of the exhaust air from the hood may constitute potential sources of inaccuracy. Consequently, the invention allows calculation of the enthalpy of exhaust air, which, in turn, enables calculation of the heat flow before and after the heat recovery. The difference thus obtained will mainly remain for use.

The temperature of the water supplied to the process water heat exchangers has a significant effect on the heat recovery heat flow. In addition, the out door air temperature and hence the temperature of the circulated water of machine room ventilation has a high impact on the heat recovery heat flow. By contrast, the heat flow required for heating supply air is quite constant all the year round, and very low compared to the heat flows mentioned above. If necessary, the method of the invention allows for separate calculation of the heat flows of heat recovery heat exchangers, and then the enthalpy of exhaust air is preferably also calculated between the heat exchanger units, as well as the heat flow removed by moisture condensed in the heat exchanger units.

In one embodiment of the invention, a method was developed for the monitoring system of the invention, by means of which the heat recovery heat flow can be bound to each specific situation, thus providing comparable data about the heat recovery operation. This variable, which is called heat recovery efficiency ($EFF_{rec}$), can be calculated as follows:

$$EFF_{rec}=(Q_{rec}/(Q_{pw}+Q_{MR}+Q_{sup}))*(m_{ev,dim}/m_{ev})$$

in which $Q_{rec}$ is the heat recovery heat flow, $Q_{pw}$ is the heat flow required for heating the process water, i.e. the heat flow consumed for heating fresh water to the temperature of the warm-water tank, $Q_{MR}$ is the heat flow required for heating the ventilation air of the machine room ventilation, $Q_{sup}$ is the heat flow required for heating the supply air in the dryer section, $m_{ev,dim}$ is the dimensioned evaporation amount, i.e. the machine constant in the dryer section, $m_{ev}$ is the real water evaporation quantity of the dryer section. The heat flow $Q_{pw}$ required for process water heating can be calculated by means of the difference between the temperatures of the fresh water and the hot process water.

The dimensioned evaporation amount of the dryer section $m_{ev,dim}$ can be determined e.g. as in the following example: if the paper production rate of a paper machine should comprise a given number of tons per hour, then the wire section and press section techniques available will determine the dry solids content of the paper web brought to the dryer section. The paper quality factors, which vary according to the paper grade, will determine the level of the final dry solids content. Quality factors may vary even within one paper grade. This difference between the dry solids contents should be achieved in the dryer section, in other words, a certain amount of water should be evaporated in the dryer section. The dryer section should hence be dimensioned such that this amount of water is discharged from the web. Such an amount of water is called the dimensioned evaporation amount of the dryer section $m_{ev,dim}$. The overall evaporation amount is naturally affected by the machine speed of the paper machine, i.e. the speed of the paper web produced by the paper machine, the width of the produced paper web, and also the paper grammage. These values are dimensioning constants that may vary depending on the production conditions. However, the paper machine, its dryer section and its devices are always dimensioned in view of a given evaporation amount. Evaporation is usually performed by means of dryer cylinders, the number of cylinders and the heating steam pressure being variable parameters for achieving the desired evaporation amount.

An other option for calculating the heat recovery efficiency ($EFF_{rec}$) is:

$$EFF_{rec}=(Q_{rec}/(Q_{pw}+Q_{MR}+Q_{sup}))*(1/m_{ev})$$

in which the machine constant $m_{ev,dim}$ is not used. When this second formula for calculating heat recovery efficiency is used, the numeric value may, if necessary, be ultimately multiplied by a number $m_{ev,dim}$ describing the appropriate dimensioned evaporation amount.

A typical method of one embodiment of the invention comprises in the paper machine:

calculation of the heat recovery heat flow $Q_{rec}$, calculation of the heat flow $Q_{pw}$ required for heating the process water, i.e. the heat flow consumed when the fresh water is heated to the temperature required in the process, calculation of the heat flow $Q_{MR}$ required for heating the ventilation air for the machine room ventilation of the paper machine calculation of the heat flow $Q_{sup}$ required for heating the supply air of the dryer section, calculation of the evaporation amount $m_{ev}$ of the dryer section determination of the dimensioned evaporation amount of the dryer section $m_{ev,dim}$ calculation of the heat recovery efficiency $EFF_{rec}$ according to the formula:

$$EFF_{rec}=(Q_{rec}/(Q_{pw}+Q_{MR}+Q_{sup}))*(m_{ev,dim}/m_{ev})$$

One embodiment of the invention additionally comprises:

measurement of the temperature, moisture and amount of exhaust air from the hood and calculation of the evaporation amount of the dryer section $m_{ev}$ on the basis of the temperature, moisture and amount of exhaust air from the hood.

One application of the system of the invention in a paper machine comprises means for implementing the steps of the method above. The measurements above are typically made by means of prior art gauges, such as temperature, moisture and mass flow sensors. The necessary calculations are typically carried out in a computer memory under computer software.

The heat recovery efficiency can be used as a variable in the evaluation of the energy efficiency of the dryer section. The heat recovery efficiency is directly proportional to the energy efficiency of the dryer section. The heat recovery efficiency may also serve as an error indicator, for instance, for detecting whether the washing sprays of the heat exchangers are continuously switched on or whether there are malfunctions in the process water heating. Usually the heat recovery comprises at least wash water jets on the exhaust air-side for periodic washing of the heat exchangers to keep them clean. If a heat exchanger is fouled, the pressure loss of the exhaust air will increase and the heat transfer will decrease. Decreased heat transfer results in decreased final water temperature or air temperature, requiring accordingly increased amounts of fresh steam for heating. With the washing sprays continuously switched on due to malfunction, water is wasted and the desired recovered air or water temperature is reduced, since part of the heat energy is removed along with the water.

The heat recovery efficiency ($EFF_{rec}$) can be used as a variable that is independent of seasons and similar parameters. Thus the heat recovery efficiency $EFF_{rec}$ can be used for expressing, during all seasons, inefficient heat energy use of a paper machine with higher accuracy than similar prior art variables.

In one embodiment of the invention, the heat recovery operation can be monitored by other variables as well, besides mere monitoring of the heat recovery efficiency. The theoretical heat recovery efficiency indicates the percentage of recovered heat flow from the exhaust air of the dryer section. It can be calculated e.g. by the formula:

$$\eta_{rec}=Q_{rec}/Q_1$$

in which $Q_{rec}$ is the heat recovery efficiency and $Q_1$ is the heat flow of the exhaust air from the hood before the heat recovery. 0° C. is used as a reference in the calculation of the exhaust air enthalpy. In order to reach 100% efficiency, one would need to cool the exhaust air to this temperature, and this is usually not feasible. In the practice, it is possible to reach approximate efficiencies of typically 70%. The efficiency typically drops towards spring in the northern hemisphere, as the outdoor temperature rises, requiring less heat to be transferred to machine room ventilation.

One embodiment of the invention also allows for calculation of the heat recovery ratio. The heat recovery ratio indicates the percentage of the heat flow that is recovered as heat recovery heat flow from the fresh steam brought to the dryer section. The heat recovery ratio can be calculated by the following formula:

$$R_{rec}=Q_{rec}/Q_{dry}$$

This ratio is higher than the theoretical heat recovery efficiency, because part of the heat recovery heat flow is returned to the dryer section along with the supply air. In addition, the energy input of the paper web to the dryer section is higher than its output from the dryer section. In the optimal case, even nearly 90% recovery ratio can be achieved. The heat recovery ratio typically decreases in the spring in the northern hemisphere, when the outdoor air and any fresh water used are warmer. Then fresh water heating requires less heat transfer than in the winter.

In one embodiment of the invention, the ratio of secondary heat flows to primary heat flows is monitored. The secondary/primary heat flow ratio ($R_{SP}$) indicates the percentage of the amount of heat flow recovered in the heat recovery from the total amount of heat flow brought to the paper machine, and it can be calculated as follows:

$$R_{SP}=Q_{rec}/Q_{tot}$$

in which formula $Q_{rec}$ is the heat recovery heat flow and $Q_{tot}$ is the steam heat flow.

Under good running conditions, heat recovery allows for maximum recovery of the heat consumed in a paper machine. In the optimal case, an approximate proportion of 60% is achieved. In proportion to the other parameters, such as the season and the like, this ratio $R_{SP}$ indicates when the heat energy use of the paper machine is inefficient.

In one embodiment of the invention, underpressure measurements of the runnability components can be set for monitoring the operation of the runnability components, such as e.g. the blow boxes. The measurements can be set e.g. only in part of the runnability components, preferably in those located in a single-wire run area, at the forward end of the dryer section. The measurement can be performed e.g. on the drive side of the runnability component by installing a thin pipe between the runnability component and the wire, with the pipe conducting from the space to be measured to an underpressure gauge, from where the measurement result is transmitted for further processing. Then the underpressure of the runnability components is compared with the surrounding air pressure, which is assumingly relatively constant.

Besides to underpressures of the runnability components, monitoring may relate to a change in the pressure over the blowers of the runnability component. The measurements may indicate an increase in the pressure difference if one or more of the runnability components are severely or totally obstructed.

Monitoring the function of the runnability components brings about several advantages, because it allows for anticipation of malfunctions and/or the need of repair. It provides information about i.a. possible malfunctions in the controls of the runnability components, deficient balancing of the runnability component system, fouling or obstruction of the runnability component nozzles and/or blowers. The data thus collected allow for enhanced service planning of the runnability components and/or air system. It also allows the runnability of the dryer section of the paper machine to be maintained on an optimal level.

In one embodiment of the invention, the pressurisation of the hood ceiling space can be monitored, allowing anticipation of the service life of the ceiling and wall structures of the hood. If the hood ceiling is under overpressure, the pressure will continuously make hot and humid air penetrate into the wall structures. This, in turn, will wet the insulations. This results in a distinct increase of heat leakage of the hood and in shorter service life of the constructions. For monitoring the pressurisation of the ceiling, a sensor for temperature measurement can be installed. The sensor measures the mixing temperature of the ceiling space and the machine room air. When the temperature indicated by the sensor exceeds that of the machine room air, the flow through the hole is directed outwardly, and the ceiling space is consequently under overpressure. On the basis of the result obtained the hood air distribution, i.e. the ratios of exhaust air, incoming air and/or circulating air of the hood can be adjusted, whenever necessary.

Fouling is one of the phenomena that harm heat recovery. In the practice, fouling occurs most frequently on the exhaust air -side, because the exhaust air entrains fibre and filler dust from the hood, which subsequently adheres to the heat transfer surfaces thereby increasing the heat transfer resistance. In addition, the process water heat exchangers may be fouled on the inside if merely mechanically purified natural water is used as fresh water. This would allow impurities dissolved into the water, such as humus, to reach the process and adhere to the heat transfer surfaces of the heat exchangers.

In one embodiment of the invention, one may, for monitoring fouling in the heat recovery, provide pressure difference measurements in the heat recovery tower, which allow monitoring of change of pressure loss generated in the exhaust air flow by individual heat exchangers or by sets of several exchangers. They also enable monitoring of pressure changes in the hot-water system generated by the process water heat exchangers. The following equation can be noted regarding the exhaust air mass flow from the dryer section and the pressure loss in the air duct generated by the heat recovery tower, the equation providing evaluation of increased pressure loss caused by obstruction due to fouling:

$$CI_{rec}=\Delta p/m_{exh,d}^2$$

in which $\Delta p$ is the pressure loss generated by the heat exchangers in the exhaust air duct and $m_{exh,d}$ is the exhaust air mass flow from the dryer section through the heat recovery. The pressure loss of the exhaust air flow increases typically as the fouling and obstruction of the heat exchangers increase.

By monitoring whether the heat exchangers are obstructed, one can detect any fault conditions and/or needs for repair, such as fouling or possible mechanical damages of the sets of heat exchangers, such as bulges. This allows for enhanced planning of the service and cleaning of the sets of heat exchangers.

A secondary condenser or final steam condenser is typically used for condensing any steam flowing from the drying groups of the dryer section, and it can also be partly used for generating the underpressure required for removing the condensate from the drying groups. In one embodiment of the invention, the amount of discharged steam can be supervised by monitoring the performance of the secondary condenser. Generally speaking, the amount of discharged steam is preferably maintained at a low level. Thus the energy obtained by steam condensation is primarily used for drying the paper. The heat flow of the secondary condenser can be calculated by the following formula:

$$P = m_{cool} c_p \Delta t$$

in which P is the heat flow [kW], $m_{cool}$ is the mass flow of cooling water [kg/s], $c_p$ is the specific heat capacity of water (4.19 kJ/kg*K) and $\Delta t$ is the temperature change of the cooling water in the condenser. If the secondary condenser heat flow starts increasing, the steam flow can be reduced and the steam pressure differences of the drying groups can be adjusted.

The condensate return degree indicates the amount of the steam mass flow supplied from a power plant that is returned in the form of condensate. As a rule, the return degree in a paper machine should usually be of the order of 80%. If the return degree drops significantly below this, there may be problems in the paper machine regarding condensate discharge and/or leakage in the steam or condensate lines. A deteriorated return degree immediately incurs expenses in the form of water purification and heating. In one embodiment of the invention, the condensate return degree is used in the method and system of the invention for evaluating and/or controlling the state, runnability and/or energy economy of a paper machine and/or its dryer section. The return degree can be calculated by the formula:

$$R_{CR} = m_c / m_{st}$$

in which $m_c$ is the mass flow of the power plant condensate and $m_{st}$ is the mass flow of power plant steam.

In one embodiment of the invention, limit values are defined for a good, passable or poor state of each of the measured variables mentioned above. The determination is made by empirical means, for instance, whereby the behaviour of the variables to be measured is monitored over a given sufficiently long period and the limit values to be applied are determined empirically. The limits can also be determined by mathematical and/or statistical means. The limit values obtained are typically specific for each machine and paper grade to be produced. Whenever necessary, the limit values can be modified.

A system according to one embodiment of the invention comprises a system for monitoring a paper machine, which is run by means of a computer and a software product of the invention arranged to be run in the computer memory. By means of the software product, a user interface of the paper machine is provided in a computer display means, or the software product is integrated in an already existing user interface of the paper machine, allowing monitoring of variables of the invention describing the operation of the paper machine and its dryer section. It is preferably possible to use the same user interface and system for controlling the operation of the paper machine and its dryer section.

In the monitoring system of one embodiment of the invention, the user interface is provided with two levels. One or more measurable variables, so-called main variables relevant for the energy use of the paper machine dryer section and the runnability systems, are selected for the main level. A virtual gauge is preferably created for each main variable. The selected main variables preferably are:

overall specific heat energy consumption of the paper machine (MWh/tn of paper)

specific heat energy consumption of the dryer section (MWh/tn of paper)

specific heat energy consumption of the evaporation (MWh/kg of $H_2O$)

heat recovery efficiency (%)

dry solids content after the press (%)

heat flow of the secondary condenser (MW)

indicator of the operation of the runnability components.

Among the numerical values of the monitoring system of the paper machine, only the overall specific energy consumption of the paper machine is preferably displayed on the user interface, the numerical values of the other variables being displayed e.g. when the indicator bar is indicated with the mouse. The virtual gauges preferably comprise red, yellow and green areas as symbols of a good, passable and poor value of the variable to be measured. At least some of the virtual gauges may include only a red and a green area.

In one embodiment of the invention, it is possible to generate one or more supplementary pages in the monitoring system for displaying more information about the state of the paper machine and/or its dryer section. Such supplementary variables preferably comprise:

obstruction state LTO underpressure or overpressure of the hood ceiling space of the dryer section secondary/primary heat flow ratio (%)

pressure difference of the process water heat exchanger or heat exchangers in the heat recovery (kPa).

In another embodiment of the invention, the heat recovery efficiency parameters and/or the return ratio of the power plant condensate can be presented as a main variable and/or supplementary variable:

heat flow of the supply air heating heat exchangers of the heat recovery (MW)

power of the water heating heat exchangers of the heat recovery (MW)

theoretical efficiency of the heat recovery (%)

recovery ratio of the heat recovery (%)

return degree of power plant condensate (%)

In one embodiment of the invention, one or more measured or calculated main variables and/or supplementary variables are displayed on the user interface of the monitoring system of the paper machine by means of suitable computer program in the form of a virtual gauge. Such a virtual gauge typically has at least two areas of different colours, e.g. at least a green area and a red area, and also an indicator indicating one of the differently coloured areas of the gauge. The computer program for controlling the gauges can be provided e.g. such that the indicator indicates the green area of the gauge if the variable to be indicated has a good value, i.e. a value such that does not require the user of the user interface to take actions for correcting the value of this variable. On the other hand, the same indicator can be set to indicate the red area of the gauge if the variable to be indicated has a poor value, i.e. such that the user of the user interface has to take actions for correcting the value of this variable. The gauge may comprise more than two areas of different colours. Thus, for instance, between the green and red areas mentioned above there may be arranged a yellow area, which is selected to be indicated when the variable to be indicated by the gauge has a passable value. Then the variable may have e.g. such a value that the paper quality is acceptable, yet so close to poor that the user of the user interface has reason to prepare and shortly take actions for correcting the value of this variable.

The present invention provides means for immediate determination of deviations occurring in the process. The invention also allows for more economic drive of the paper machine and/or its dryer section, because the distinct measurement variables indicate any issues to be improved in the process. At the same time, the very process of compiling a system of the invention may be useful for finding malfunctions in the paper production process. Thus, for instance, during determination of empirically suitable limit values for the variables to be monitored, one can detect defects in the process. Highly energy-consuming process situations can be prevented with relatively low investments owing to the method and system of the invention. The invention also allows monitoring of the state and operation of different devices in a paper machine, thus facilitating advance planning of repairs and maintenance.

The method and system of the invention are apt to be installed both in already existing paper machines and in new paper machines. If necessary, the necessary number of sensors can be provided in an existing paper machine and/or its dryer section for performing the measurements necessary for the invention.

BRIEF DESCRIPTION OF THE DRAWINGS

The invention is illustrated below by exemplifying figures, in which

FIG. 2 is a schematic view of measurements provided in the dryer section when the dryer section has an XT control system or the like.

DETAILED DESCRIPTION OF THE ILLUSTRATED EXAMPLES

Figure 1:
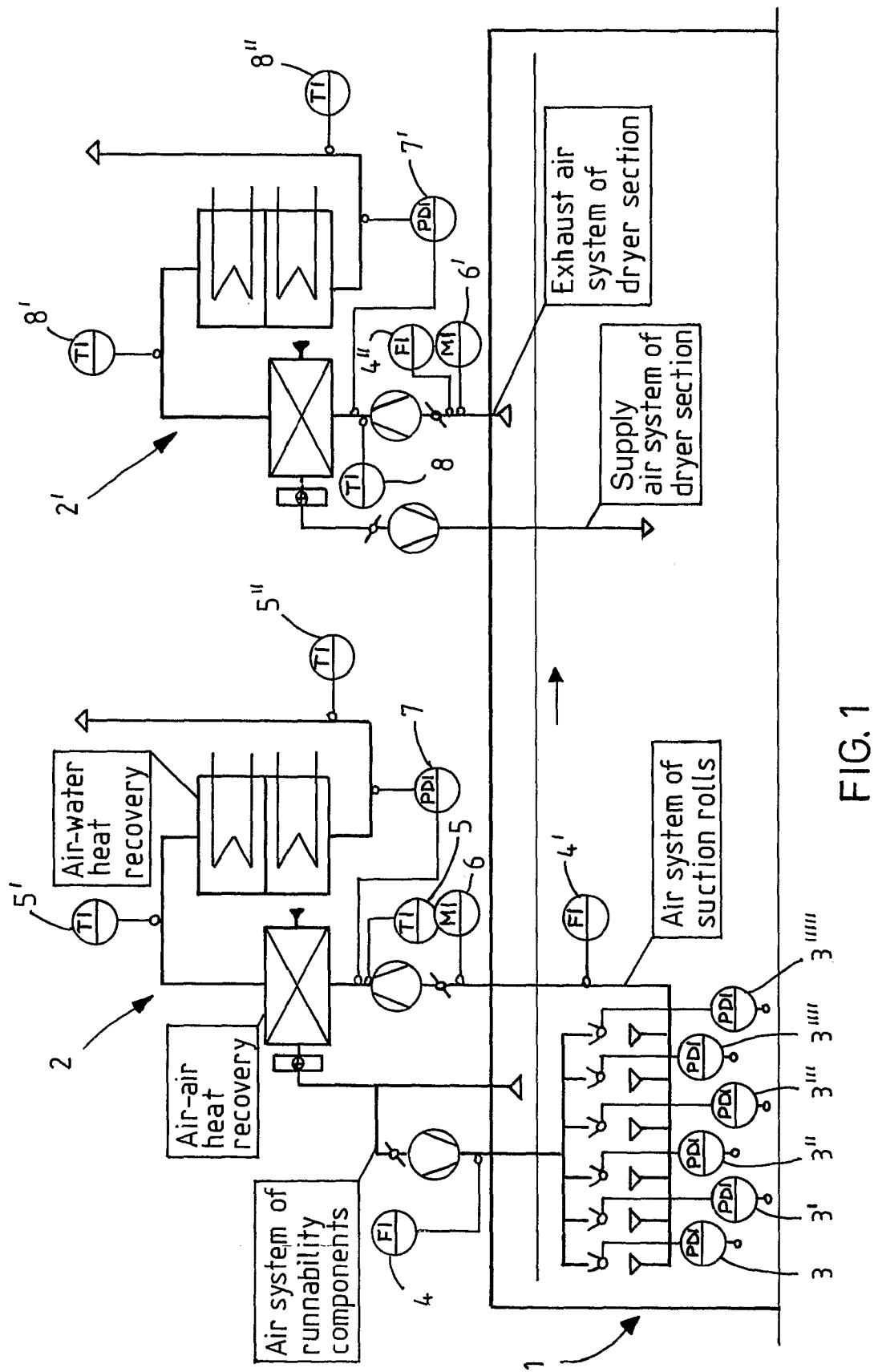
FIG. 1 is a schematic view of measurements provided in the dryer section when the dryer section is devoid of an XT control system.
Figure 2:
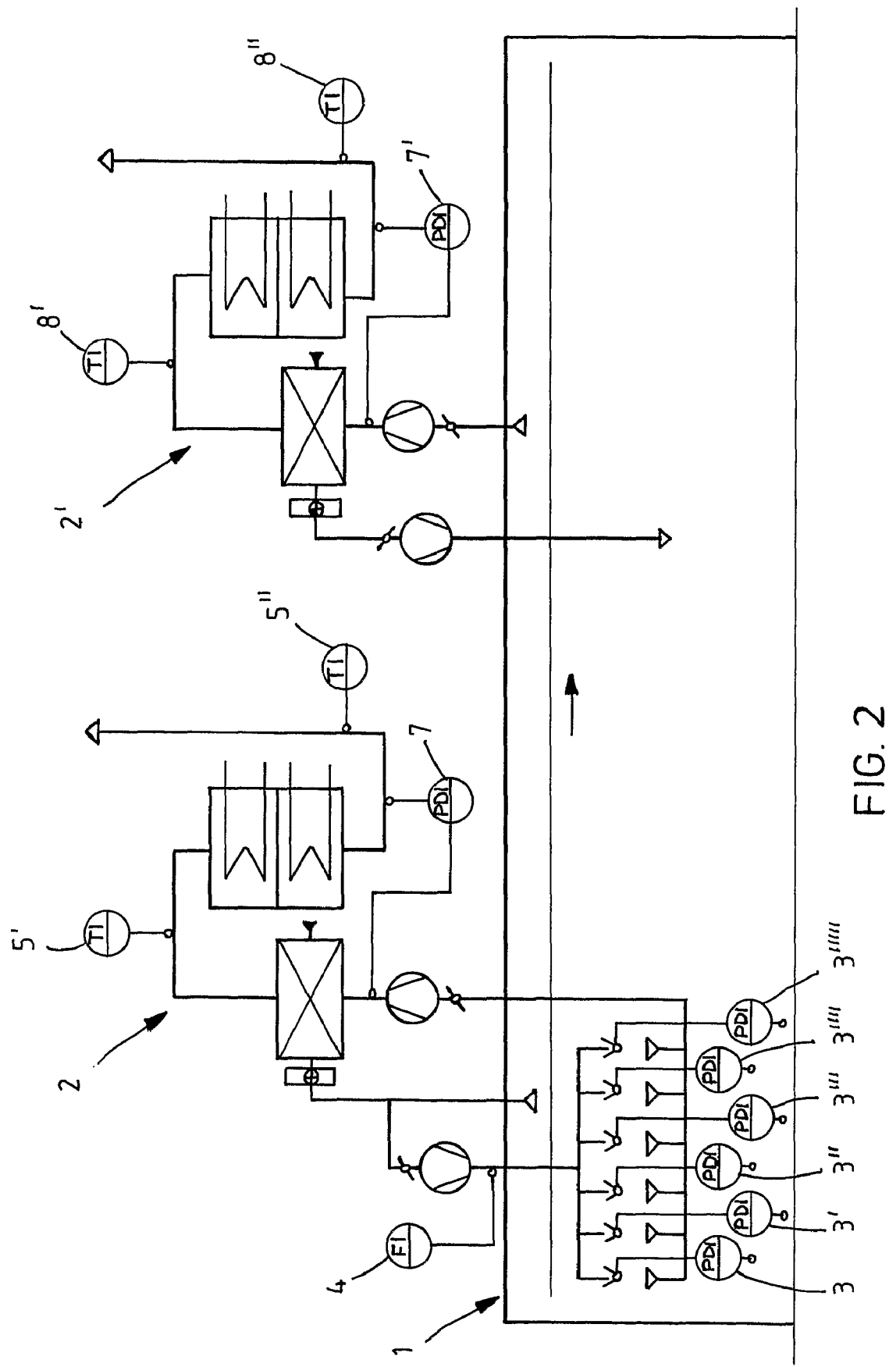

The first graph illustrates ventilation measurements in the monitoring system of the invention; the second graph illustrates measurements that need to be set if the machine is already provided with an XT control system. The accompanying graphs neither illustrate the principle of XT control nor the transmission of measurement data to the process computer. These are obvious solutions to those skilled in the art.

Pressure difference sensors 3, 3', 3", 3''', 3"", 3"'" for measuring the underpressure generated by the runnability components are provided in the lower part of the hood 1. The graph exemplifies six first runnability components equipped with pressure difference sensors. The air flow of the runnability components is measured by a flow sensor 4. In this example, discharged from one area, the exhaust air of the rolls generating underpressure, e.g. Metso VacRoll™ (trademark holder: Metso Corporation, Finland), is led to the first heat recovery 2. The exhaust air duct of the suction rolls is provided with a flow sensor 4', a temperature sensor 5 and a moisture sensor 6. The first heat recovery 2 comprises an air/air heat recovery unit and an air/water heat recovery unit. In this text, a heat recovery unit denotes e.g. a heat exchangers or a set of several exchangers. In addition, a pressure difference sensor 7 measures the pressure difference over the heat recovery units of the heat recovery 2. The temperature sensors 5', 5" also measure the air temperature after the air/air heat recovery unit and the air/water heat recovery unit. These temperature measurements enable separate calculation of the heat recovery heat flow in air and water, without using complex moisture measurements.

A system in which the air from VacRoll™ suction rolls is conducted directly to the heat recovery has been described in the patent specification FI 107395. However, for utilising the monitoring system, the ventilation does not necessarily have to be similar to the one described in this patent specification, but may also be a so-called conventional system, which does not have suction rolls, or in which exhaust air is not conducted to the heat recovery.

The second heat recovery 2' performs heating of the supply air of the dryer section. The second heat recovery 2' comprises an air/air heat recovery unit and an air/water heat recovery unit. The supply air system can also perform measurements, e.g. for XT control, serving to control the amount and temperature of supply air. The graph does not illustrate such measurements.

The second heat recovery 2' performs measurements of the exhaust air from the hood 1, i.e. from the paper machine dryer section, with flow sensor 4" regarding the amount of the air, with moisture sensor 6' regarding its moisture and with temperature sensor 8 regarding its temperature. The second heat recovery 2' also measures the pressure difference over the heat recovery units with the pressure difference sensor 7' and the temperature by means of temperature sensors 8', 8" disposed between and after the heat recovery units.

Graph 2 is a schematic view of measurements arranged in the dryer section if the dryer section is provided with an XT control system or similar. The measurements included in the XT control system are not illustrated in graph 2.

Graph 2 thus shows that pressure difference sensors 3, 3', 3", 3''', 3"", 3"'" have been disposed in the lower part of the dryer section hood 1 for measuring the underpressure generated by the runnability components. The air flow of the runnability components is measured by a flow sensor 4. In addition, the pressure difference sensor 7 measures the pressure difference over the heat recovery units of the heat recovery 2 and the air temperature after the air/air heat recovery unit and the air/water heat recovery unit is measured by temperature sensors 5', 5".

The second heat recovery 2' in graph 2 measures the pressure difference over the heat recovery units by means of the pressure difference sensor 7' and the temperature by means of temperature sensors 8', 8" disposed between and after the heat recovery units. The remaining measurements can be performed using sensors pertaining to the XT control system.

It is obvious to those skilled in the art that the invention is not limited merely to the examples given above, but may vary within the scope of the accompanying claims. Thus, for instance, all the separate arithmetic operations required by the invention on the basis of the results of specific measurements are not set forth in this text. Performed for some other purpose, such arithmetic operations are ordinary as such to those skilled in the art.

What is claimed is:

1. A method for determining a dry solids content of a web passing from a press section to a dryer section of a paper machine, the method comprising:

measuring a dry mass flow $m_{pap,d}$ of the paper web;

measuring a water mass flow contained in the web leaving a dryer section;

measuring a temperature of the exhaust air from a hood;

measuring a moisture of the exhaust air from the hood;

measuring an amount of exhaust air from the hood;

calculating a water mass flow $m_{ev}$ evaporated from the web in the dryer section based upon the temperature, moisture and amount of exhaust air from the hood;

calculating a mass flow $m_{H2O}$ of water contained in the web passing from the press section to the dryer section by summing up the water mass flow contained in the web leaving the dryer section and the water mass flow of the water $m_{ev}$ evaporated from the web in the dryer section; and calculating the dry solids content DSC of the web passing from the press section to the dryer section by the formula: $DSC=m_{pap,d}/(m_{pap,d}+m_{H2O})$.

2. The method according to claim 1, wherein the dry solids content DSC of the web passing from the press section to the dryer section is compared with predetermined limit values, the comparison allowing indication of the value of the dry solids content DSC relative to said limit values on a user interface provided in connection with the paper machine.

3. The method according to claim 2, wherein a gauge is displayed on the user interface of the paper machine with areas of different colours and an indicator indicating these areas, each area of different colour being disposed to illustrate the value of the dry solids content DSC within a range between given predetermined limit values.

4. A computer readable medium encoded with a computer program executable by a computer to perform the steps of the method according to claim 3.

5. A computer readable medium encoded with a computer program executable by a computer to perform the steps of the method according to claim 2.

6. The method according to claim 2, wherein determination of the limit values is made by at least one of empirical, mathematical and statistical means.

7. The method according to claim 1, wherein operation of the paper machine is controlled based upon the calculated dry solids content DSC of the web passing from the press section to the dryer section.

8. The method according to claim 6, wherein felt or wire replacement shutdowns are timed based upon the calculated dry solids content DSC of the web passing from the press section to the dryer section.

9. A computer readable medium encoded with a computer program executable by a computer to perform the steps of the method according to claim 8.

10. A computer readable medium encoded with a computer program executable by a computer to perform the steps of the method according to claim 7.

11. A computer readable medium encoded with a computer program executable by a computer to perform the steps of the method according to claim 1.

12. The method according to claim 1, wherein the calculated dry solids content DSC is used as an indicator of at least one of an error, a malfunction, and a required service.

13. The method according to claim 1, wherein the calculated dry solids content DSC after the press section is used for adjustment of settings at the wet end of the paper machine.

14. The method according to claim 1, wherein at least one of the settings adjusted is pressure in a dewatering device, chemical feed rate, linear pressure in the press, and press steam box parameters.

15. A system for determining a dry solids content of a web passing from a press section to a dryer section of a paper machine, the system comprising:

means for receiving a value of a dry mass flow $m_{pap,d}$ of the paper web;

means for receiving a value of a water mass flow contained in the web leaving the dryer section;

means for measuring a temperature of an exhaust air from a hood;

means for measuring a moisture of the exhaust air from the hood;

means for measuring an amount of the exhaust air from the hood;

means in the dryer section for calculating a water mass flow of the water evaporated from the web based upon the temperature, moisture and amount of exhaust air from the hood;

means for calculating a water mass flow of the water $m_{H2O}$ contained in the web passing from a press section to the dryer section by summing up the water mass flow of the water contained in the paper leaving the dryer section and the water mass flow of the water evaporated from the web in the dryer section; and means for calculating the dry solids content DSC of the web passing from the press section to the dryer section by the formula: $DSC=m_{pap,d}/(m_{pap,d}+m_{H2O})$.

16. The system according to claim 15, further comprising:
a paper machine user interface;
a gauge disposed in the user interface for indicating the value of the dry solids content DSC;
means for comparing the dry solids content DSC of the web passing from the press section to the dryer section with predetermined limit values; and
means for indicating the value of the dry solids content DSC in the gauge of the paper machine user interface compared to said limit values.

17. The system according to claim 16, wherein the gauge comprises areas of different colours, each area of different colour being disposed to illustrate the value of the dry solids content DSC in a range between given predetermined limit values, and an indicator disposed to indicate said areas.

18. The system according to claim 15, further comprising means for controlling operation of the paper machine based upon the calculated dry solids content DSC of the web passing from the press section to the dryer section.

19. A method for determining efficiency of heat recovery in a paper machine, comprising:
calculating a heat recovery heat flow $Q_{rec}$;
calculating a heat flow $Q_{pw}$ required for heating a flow of process water consumed during heating of fresh water to the temperature required for a process;
calculating a heat flow $Q_{MR}$ required for heating ventilation air of machine room ventilation;
calculating a heat flow $Q_{sup}$ required for heating supply air of a dryer section;
calculating an evaporation amount $m_{ev}$ of the dryer section;
determining a dimensioned evaporation amount in the dyer section $m_{ev,\,dim}$; and
calculating the heat recovery efficiency $EFF_{rec}$ by the formula:

$$EFF_{rec}=(Q_{rec}/(Q_{pw}+Q_{MR}+Q_{sup}))*(m_{ev,\,dim}/m_{ev}).$$

20. The method according to claim 19, further comprising:
measuring a temperature of the exhaust air from a hood;
measuring a moisture of exhaust air from the hood;
measuring an amount of exhaust air from the hood; and
calculating an evaporation amount $m_{ev}$ of the dryer section based upon the temperature, moisture and amount of exhaust air from the hood.

21. A computer readable medium encoded with a computer program executable by a computer to perform the steps of the method according to claim 20.

22. A computer readable medium encoded with a computer program executable by a computer to perform the steps of the method according to claim 19.

23. The system according to claim 19, further comprising a user interface, which is provided with a main level including one or more main variables relevant for the energy use of the paper machine dryer section and the runnability systems, said main variables comprising one or more of:

- an overall specific heat energy consumption of the paper machine;
- a specific heat energy consumption of the dryer section;
- a specific heat energy consumption of the evaporation;
- a heat recovery efficiency;
- a dry solids content after the press;
- a heat flow of the secondary condenser; and
- an indicator of the operation of the runnability components.

24. The system according to claim 23, further comprising a gauge for each main variable, the gauge comprising red, yellow and green areas as symbols of a good, passable and poor values of the variable measured.

25. The system according to claim 24, wherein the user interface is provided with one or more supplementary pages in the monitoring system for displaying information about the state of at least one of the paper machine and its dryer section by using supplementary variables comprising one or more of:

- fouling degree of the heat recovery;
- underpressure or overpressure of a hood false ceiling space of the dryer section;
- secondary/primary heat flow ratio; and
- pressure difference of a process water heat exchanger or heat exchangers in heat recovery.

26. The system according to claim 23, wherein the user interface is provided with one or more supplementary pages in the monitoring system for displaying information about the state of at least one of the paper machine and its dryer section by using supplementary variables comprising one or more of:

- fouling degree of the heat recovery;
- underpressure or overpressure of a hood false ceiling space of the dryer section;
- secondary/primary heat flow ratio; and
- pressure difference of a process water heat exchanger or heat exchangers in heat recovery.

* * * * *